June 13, 1950 C. K. LE FIELL 2,511,116
HOG DEHAIRING MACHINE
Filed Nov. 21, 1947 2 Sheets-Sheet 1

INVENTOR.
CECIL K. LE FIELL,
BY
Hazard & Miller
ATTORNEYS.

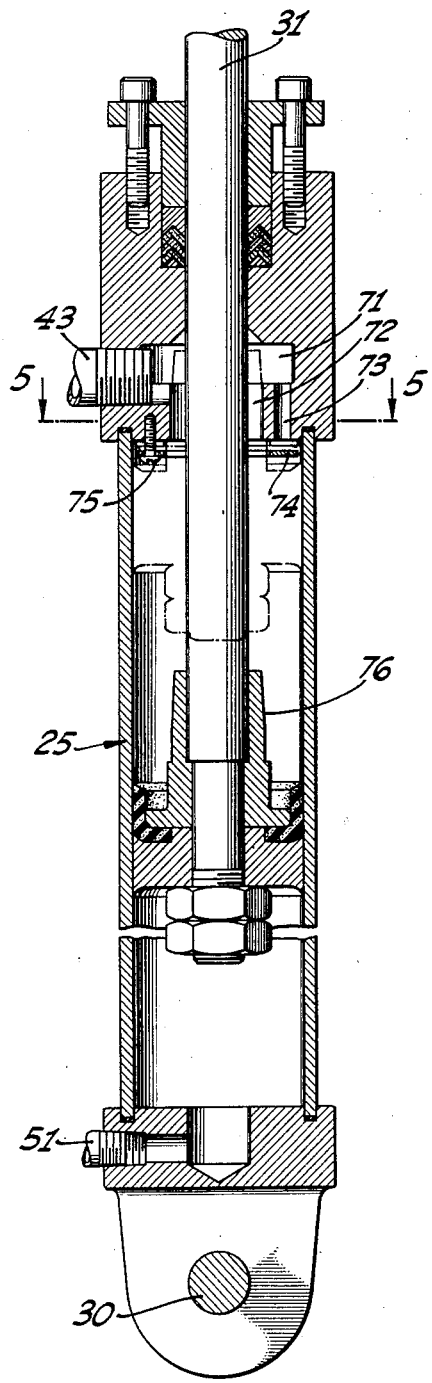
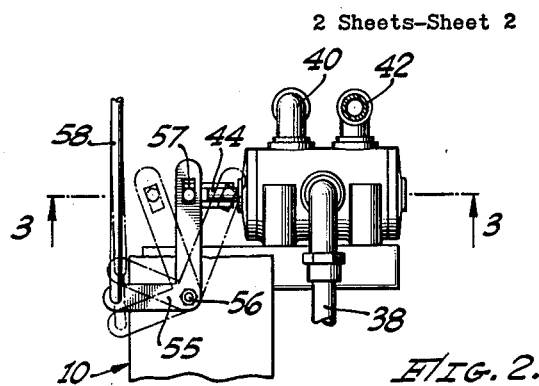
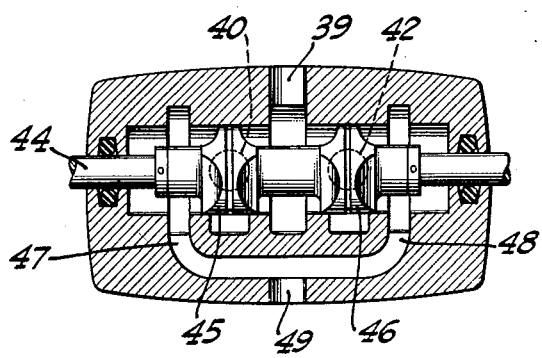
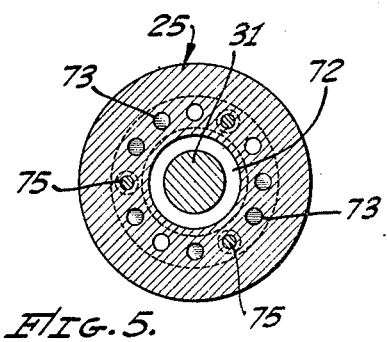

Patented June 13, 1950

2,511,116

UNITED STATES PATENT OFFICE 2,511,116

HOG DEHAIRING MACHINE

Cecil K. Le Fiell, Los Angeles, Calif.

Application November 21, 1947, Serial No. 787,372

4 Claims. (Cl. 214—1)

1

This invention relates to a hog dehairing machine.

Heretofore hog dehairing machines have been provided consisting essentially of a grate over which there is disposed a throw-out cradle when in its normal position. At the side of the machine there is a throw-in cradle adapted to receive a hog carcass in the scalding tank and which is adapted to lift the carcass therefrom and deposit it in the throw-out cradle while the throw-out cradle is in its normal position over the grate. Adjacent the side of the grate there is a rotor carrying a plurality of resilient paddles each of which is equipped with one or more scrapers. These paddles during rotation of the rotor pass between the bars of the throw-out cradle and the grate plates aligned therewith to engage and scrape the hair from the carcass. In the course of scraping, the carcass is caused to roll or turn within the throw-out cradle and upon completion of the dehairing operation the carcass is lifted from the machine by the throw-out cradle and caused to slide therefrom onto a cutting table.

In hog dehairing machines of this character which have heretofore been provided, the throw-in cradle and the throw-out cradle are independently operated so that it is possible to operate the throw-in cradle while the throw-out cradle is in its emptying or elevated position. If this occurs the hog carcass is deposited on top of the grate and it is very difficult to extricate the carcass therefrom. Also, in the machines of this character heretofore provided there is usually a source of power and single revolution clutches are used to operatively connect the throw-in and throw-out cradles to the source of power. These single revolution clutches, when engaged, operate their respective cradles but have the objection that once they are engaged each cradle must undergo a complete cycle of its operation. In other words, once the single revolution clutch for the throw-in cradle has been engaged, the throw-in cradle must thereafter undergo its complete cycle of movement. The same is true of the throw-out cradle. It sometimes is desirable, however, to stop either cradle immediately after it has commenced its movement and allow either cradle to return to its normal position. It is therefore an object of the present invention to provide an improved hog dehairing machine which is so designed that the two cradles are operatively connected together in such a manner that it is impossible to operate the throw-in cradle unless the throw-out cradle is either in a position to receive the carcass or is approaching

2 such a position. Consequently, it is impossible through accident or lack of attention to deposit a carcass on the grate. The improved construction is also advantageous in that full control of both cradles is had at all times in that it is possible to stop the operation of either cradle at any point of its movement or at any time during its cycle of normal operation. Furthermore, by proper manipulation the cradles may, if desired, be caused to undergo a succession of partial operations or jerky movements to dislodge the carcass therefrom if such movements are necessary.

Still another object of the invention is to provide a hog dehairing machine wherein the cradles are hydraulically actuated by a mechanism that not only functions smoothly with a minimum noise but is so designed as to dampen or cushion certain movement and which is automatic to the extent of causing the cradles to automatically return to their normal positions after their throw-in or throw-out movements, as the case may be, have been completed.

With the foregoing and other objects in view, which will be made manifest in the following detailed description and specifically pointed out in the appended claims, reference is had to the accompanying drawings for an illustrative embodiment of the invention wherein:

Fig. 2 is an enlarged partial view in section taken substantially upon the line 2—2 upon Fig. 1;

Fig. 3 is an enlarged sectional view taken substantially upon the line 3—3 upon Fig. 2;

Fig. 4 is an enlarged sectional view through the hydraulic cylinder used to actuate the throw-out cradle of the dehairing machine; and Fig. 5 is a horizontal section taken substantially upon the line 5—5 upon Fig. 4.

Figure 1:
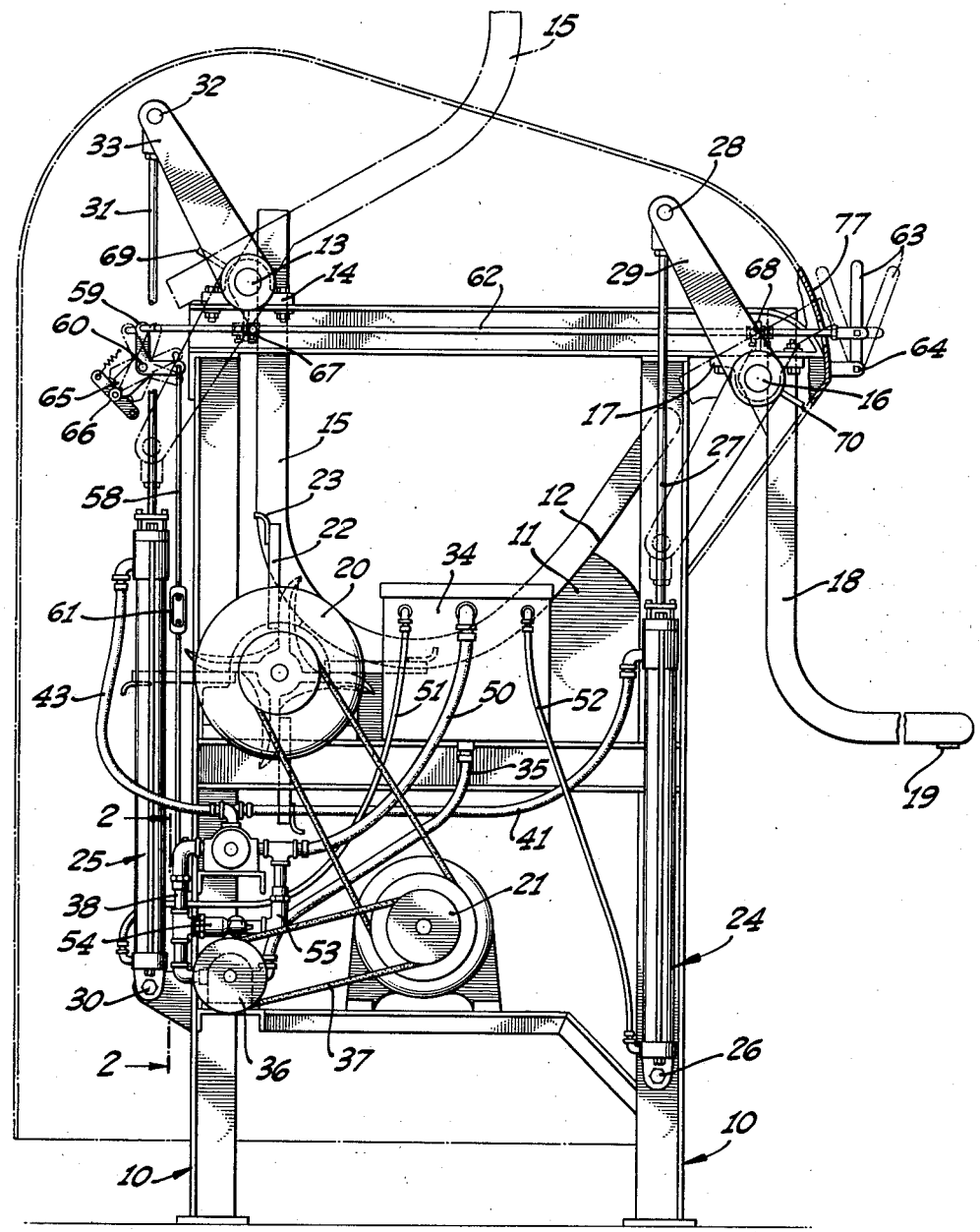
Figure 1 is a view in end elevation of the working parts of the control mechanism of the hog dehairing machine embodying the present invention.

Referring to the accompanying drawings wherein similar reference characters designate similar parts throughout, the hog dehairing machine illustrated consists of a suitable frame generally indicated at 10 which supports a grate indicated at 11. This grate in conformity with conventional hog dehairing machines consists of a series of parallel spaced plates presenting concave upper edges indicated at 12. A throw-out cradle is rotatably mounted by means of a rocker shaft 13 mounted in suitable bearings 14. This throw-out cradle consists of a plurality of spaced hook-shaped bars 15 that are arranged in vertical alignment with the plates of the grate 11 and normally assume positions resting against the concave upper edges 12 of the grate plates. In a similar manner a throw-in cradle is mounted for swinging movement by means of a rocker shaft 16 mounted in bearings 17 and consists of a plurality of spaced bars 18 the ends of which may be connected by a bar 19. The throw-in cradle assumes a normal position as indicated in Fig. 1 wherein the ends of the bars 18 are submerged in the scalding tank. This cradle is adapted to receive the hog carcass and on swinging upwardly in a counterclockwise direction, as viewed in Fig. 1, to deposit the carcass on the throw-out cradle. Adjacent the grate and the throw-out cradle there is a rotor 20 driven by means of an electric motor 21 and which carries a multiplicity of resilient paddles 22. These paddles are each equipped with one or more metal scrapers 23 which, during rotation of the rotor, pass between the plates of the grate 11 and between the bars 15 of the throw-out cradle to engage the hog carcass and effectively scrape the hair therefrom. During this scraping operation the carcass is turned or rolled over and when the dehairing is completed the throw-out cradle swings in a counterclockwise direction from the full line position shown in Fig. 1 to the dotted line position illustrated therein to discharge the dehaired carcass onto a gambrelling table.

The means for actuating the two cradles in accordance with the present invention consists of two hydraulic cylinders generally indicated at 24 and 25 respectively. The hydraulic cylinder 24 which actuates the throw-in cradle is pivotally mounted on the frame 10 as at 26. It has a piston reciprocable therein, the piston rod of which, indicated at 27, is pivotally connected at 28 to a crank 29 mounted on the end of the rocker shaft 16. In a similar manner cylinder 25 is pivotally mounted on the frame 10, as indicated at 30, and its piston has a piston rod 31 pivotally connected, as at 32 to a crank 33 on the end of the rocker shaft 13. When the piston in the cylinder 24 is forced downwardly the throw-in cradle will be swung upwardly to lift the carcass from the scalding tank and deposit the carcass on the throw-out cradle which is then occupying the full line position shown in Fig. 1. The throw-in cradle is so mounted with relation to the rocker shaft 16 that it will descend by gravity from its uppermost position into its normal position shown in full lines on Fig. 1 whenever pressure within the cylinder 24 is released. In a similar manner, when the dehairing operation is completed, on applying pressure to the cylinder 25 to actuate the piston therein the throw-out cradle will be swung in a counterclockwise direction from the full line position shown in Fig. 1 to the dotted line position illustrated therein to discharge the carcass onto a gambrelling table. Whenever pressure within the cylinder 25 is released the throw-out cradle will return by gravity to the full line position shown in Fig. 1.

As a means for actuating and controlling the two cradles there is mounted on the frame 10 a suitable container 34 constituting a reservoir for a liquid such as oil. A conduit or hose 35 leads from the bottom of this reservoir to a pump 36 which is driven off of the motor 21 by a belt 37. The outlet from this pump indicated at 38 leads to the inlet port 39 of a valve. This valve has one outlet 40 that is connected by a hose or conduit 41 to the top of cylinder 24. Similarly a second outlet 42 is connected by a hose or conduit 43 to the top of cylinder 25. Within the housing of the valve there is reciprocable a valve stem 44 carrying two valve pistons 45 and 46 which, when the valve stem is in its central or neutral position, are disposed opposite the ports 40 and 42 and inwardly of passages 47 and 48 that lead to a common exhaust port 49 that is connected by means of hose or conduit 50 with the reservoir 34. The valve stem 44 can be moved either to the right or to the left of the central or neutral position illustrated in Fig. 3. Thus, if moved to the left as viewed in this figure, piston 45 serves to completely open port 40 and simultaneously piston 46 will completely close port 42 to the inlet 39 but at the same time completely open port 42 to passage 48 leading to the outlet 49. Consequently, in this position of the valve, fluid pressure from the pump 36 may pass through the pump outlet 38, inlet port 39 and through the outlet 40 and to hose or conduit 41 to the top of cylinder 24 to force the piston within the cylinder downwardly and thus actuate the throw-in cradle made up of the bars 18. While fluid pressure is thus being supplied from the pump to the cylinder 24 the interior of cylinder 25 is placed in communication with the reservoir 34 so that any pressure existing within the cylinder 25 finds immediate egress through hose 43, port 42, passage 48, outlet 49 and hose 50, back to the reservoir. Consequently if the throw-out cradle should be in elevated position or in partially elevated position, whenever the valve is thrown to supply pressure to cylinder 24, the throw-out cradle may immediately descend or return to its lowermost position shown in full lines on Fig. 1 if it is not already in that position. Consequently whenever the throw-in cradle is actuated to elevate a hog carcass the throw-out cradle must either be in its lowermost position to receive the carcass or must commence returning to that position as soon as actuation of the throw-in cradle is commenced.

On the other hand, if the valve stem 44 is shifted to the right, as viewed in Fig. 3, from the neutral position shown therein, piston 45 will close off port 40 from the inlet 39 and completely open port 40 to passage 47. Simultaneously piston 46 will fully open port 42 to the inlet port 39 and close off port 42 from passage 48. In this position of the valve fluid pressure from the pump is delivered to port 42, hose 43 to cylinder 25 to actuate the piston therein and thus operate the throw-out cradle. While the throw-out cradle is being actuated the opening of port 40 to port 49 by means of the piston 45 releases any pressure existing in cylinder 24 back through hose 41, port 40, port 49 and hose 50. Consequently, whenever the throw-out cradle is being operated the throw-in cradle cannot be actuated and must descend by gravity to its normal full line position shown, if it is not already in such position.

Whenever the valve stem 44 is in the neutral position shown on Fig. 3, fluid from the pump merely enters through port 39 and as both ports 40 and 42 are partially opened by their respective pistons 45 and 46, the fluid merely passes around the pistons through the ports 40 and 42 then through the passages 47 and 48 to the outlet port 49 and is returned to the reservoir 34 through hose 50. Under these circumstances no appreciable pressure is applied to the pistons in either of the cylinders 24 or 25 and consequently the two cradles remain in their lowermost positions with the oil merely circulating from the reservoir 34 to the pump 36 through the valve and back to the reservoir.

Hoses 51 and 52 lead from the bottoms of the two cylinders 25 and 24, respectively, back to the reservoir and merely serve to conduct off any oil that may in the course of time leak by the pistons in the two cylinders. A by-pass 53 is arranged around the valve and preferably carries a relief valve 54. This by-pass is largely a mere precautionary measure to permit of by-passing around the valve whenever pressures for some unusual reason should become excessive.

As a means for actuating the valve stem 44 a bell crank 55 is pivotally mounted as at 56 on the frame and has a pin and slot connection 57 with the end of the valve stem. The other arm of the bell crank has an actuating rod 58 pivotally connected thereto that extends upwardly to one arm of a bell crank 59 that is pivotally connected as at 60 to the frame. This rod may have a turn buckle 61 incorporated therein for purposes of adjustment. The other arm of the bell crank 59 has a horizontally extending rod 62 pivotally connected thereto that extends across the frame and which, in turn, is pivotally connected to a pivoted hand lever 63 that is pivoted as at 64. This hand lever may assume the full line position shown on Fig. 1 wherein the valve stem 44 is in its neutral or central position shown on Fig. 3. However, on swinging the hand lever 63 into either of the dotted line positions shown on Fig. 1, valve stem 44 will be shifted either to the right or to the left as the case may be from its neutral position illustrated. The bell crank 59 carries a notched extension 65 engageable with a spring actuated roller 66. This device is used to prevent the control valve, shown in Fig. 3, from remaining in a partially thrown position. In other words, in throwing the hand lever 63 the ridges at the sides of the notch on extension 65 will pass over the spring actuated roller 66 and cause the valve stem 44 to move into either of its extreme positions. Conversely, when the valve is in its neutral position, the roller 66, which enters the notch on the extension, will tend to retain the valve in its neutral position until forcibly displaced therefrom by the control lever 63.

On the horizontal rod 62 there are mounted stops 67 and 68. Stop 67 is adjustable along the length of the rod 62 and is engageable by a pin 69 carried by the rocker shaft 13 to shift rod 62 toward the right, as viewed in Fig. 1, when the throw-out cradle has reached its uppermost position. In a similar manner, stop 68 is engageable by a pin 70 on rocker shaft 16 to throw the rod 62 toward the lift when the throw-in cradle has reached its uppermost position. By means of this construction the operator need only swing the hand lever 63 into a position which will actuate the throw-in cradle and he may then release lever 63. When the throw-in cradle reaches the uppermost position of its movement, pin 70 will engage stop 68 and return rod 62 to a position that will return the control valve to neutral. When the control valve is returned to neutral, pressure within cylinder 24 is released, allowing the throw-in cradle to automatically return to its lowermost position by gravity. In a similar manner, when the throw-out cradle is actuated as it nears its uppermost position, pin 69 will engage stop 67 and actuate rod 62 to return the control valve to neutral, thus allowing the throw-out cradle to automatically descend.

The details of construction of the cylinder 25 are illustrated in Fig. 4 and as illustrated therein hose 43 leads into a chamber 71 in the top of the cylinder. Egress from this chamber into the cylinder is through a passage 72 around the piston rod 31 and also through a plurality of ports 73. The lower ends of these ports can be opened and closed by means of a ring valve 74 mounted for a slight amount of movement on a screw 75. The piston within this cylinder carries a tapered hub 76 that may enter the passage 72. When fluid pressure from the control valve through hose 43 is supplied to the cylinder 25, fluid may enter the cylinder through the passage 72 and through the ports 73. However, when pressure in cylinder 25 is released and the weight of the throw-out cradle causes it to descend by gravity to its lowermost position, the piston in this cylinder on being elevated causes the fluid in the cylinder to carry the ring valve 74 upwardly against the bottoms of the ports 73 as illustrated in dotted lines on Fig. 4. This closes these ports against egress so that fluid in the cylinder can only pass out of the cylinder through the passage 72. This passage is sufficiently small so as to retard the descent of the throw-out cradle somewhat and as the tapered hub 76 enters the passage, flow through the passage is further restricted. Consequently when the throw-out cradle approaches the top of the grate 11 its downward movement is considerably retarded so that it will not collide with the grate with any great impact. The cylinder 24 may be similarly constructed but ordinarily such a construction in this cylinder is not required inasmuch as the throw-in cradle does not engage any part corresponding to grate 11 in returning to its lowermost position.

The above described control mechanism is preferably housed within a housing or cover indicated at 77 on the end of the machine so as to be effectively protected thereby.

From the above described construction it will be appreciated that an improved hog dehairing machine is provided which is quite advantageous in the smoothness of its operation. It is impossible to operate the throw-in cradle unless the throw-out cradle is either in its lowermost position or its returning thereto to receive the hog carcass. Consequently it is impossible to deposit a hog carcass on the grate 11 while the throw-out cradle is in elevated position. In a similar manner it is impossible to operate the throw-out cradle unless the throw-in cradle is either in its lowermost position or its returning thereto. A further advantage of the construction is that it is possible to shift the single hand lever 63 at any time. Thus, if the throw-in cradle is partially elevated but it is desired to lower this cradle for any reason, the hand lever 63 can be immediately thrown to neutral position or to that position which will elevate the throw-out cradle and the throw-in cradle will immediately lower. In other words, it is not necessary for either cradle to undergo a complete cycle of operation after its movement has been commenced. This construction enables also a jerking movement to be applied to either cradle if this is desirable. Thus if the throw-in cradle is partially elevated and the control lever 63 is returned to neutral, the throw-in cradle will start to descend but if the control lever is immediately thereafter returned to the position which will elevate the throw-in cradle, the throw-in cradle will start elevating again. By a successive number of actuations of the control lever 63 in this manner the throw-in cradle can be caused to quickly rise and fall with a jerky movement if this is desirable to shift the position of the carcass thereon. The same type of movement may be imparted to the throw-out cradle in discharging the carcass from the machine if it is desired.

Various changes may be made in the details of construction without departing from the spirit and scope of the invention as defined by the appended claims.

I claim:

1. In a hog dehairing machine, the combination with a throw-in cradle and a throw-out cradle, of hydraulic cylinders having pistons therein operatively connected to the cradles for swinging the cradles respectively, means for supplying fluid under pressure to the cylinders, and a single valve controlling the supply to either cylinder in such a manner that when the valve is positioned to direct flow to one cylinder it is simultaneously positioned to release pressure from the other, and means for automatically returning the valve to a neutral position when either cradle approaches the end of its swinging movement whereby pressure is released from both cylinders.

2. In a hog dehairing machine, the combination with a throw-in cradle and a throw-out cradle mounted for swinging movement between limits within which the cradles will be urged by gravity to positions wherein the throw-in cradle is in its lower, outer position and the throw-out cradle is in its lower, inner position, of hydraulically actuated pistons operatively connected to the cradles for swinging the cradles upwardly, a source of fluid pressure for actuating the pistons, valve means between the source of fluid pressure and the pistons so arranged that when fluid is supplied to one piston it is released from the other whereby when one cradle is actuated the other descends by gravity to its normal position, and means for automatically returning the valve means to a neutral position when either cradle approaches the end of its swinging movement whereby the pressure supplied to either cylinder is released allowing the actuated cradle to return by gravity to its normal position.

3. A hog dehairing machine having a throw-in cradle swingably mounted thereon, a throw-out cradle swingably mounted thereon, hydraulically actuated pistons operatively connected to each cradle, a source of fluid pressure adapted to be supplied to said pistons, control valve means between the source of fluid pressure and the pistons operable to simultaneously release the pressure on one piston whenever pressure is supplied to the other, said control valve means being adapted to assume a neutral position wherein pressure supplied to both pistons is released, and means for automatically returning the control valve means to its neutral position whenever either cradle approaches the end of its swinging movement.

4. A hog dehairing machine having a throw-in cradle swingably mounted thereon, a throw-out cradle swingably mounted thereon, hydraulically actuated pistons operatively connected to each cradle, a source of fluid pressure adapted to be supplied to said pistons, control valve means between the source of fluid pressure and the pistons operable to simultaneously release the pressure on one piston whenever pressure is supplied to the other, said control valve means being adapted to assume a neutral position wherein pressure supplied to both pistons is released, means for automatically returning the control valve means to its neutral position whenever either cradle approaches the end of its swinging movement, and means associated with one of the pistons for retarding the descent of its cradle as it approaches the end of its descending movement.

CECIL K. LE FIELL.

REFERENCES CITED

The following references are of record in the file of this patent:

UNITED STATES PATENTS

| Number | Name | Date |
| --- | --- | --- |
| 1,995,654 | Schmidt | Mar. 26, 1935 |
| 2,100,810 | Livermore | Nov. 30, 1937 |